(12) United States Patent
Hamamoto et al.

(10) Patent No.: US 12,157,988 B2
(45) Date of Patent: Dec. 3, 2024

(54) PARAMETER MODIFICATION SYSTEM, PARAMETER MODIFICATION METHOD, AND PARAMETER MODIFICATION PROGRAM FOR WORKING MACHINE

(71) Applicant: KOBELCO CONSTRUCTION MACHINERY CO., LTD., Hiroshima (JP)

(72) Inventors: Ryo Hamamoto, Hiroshima (JP); Kazuomi Endo, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 248 days.

(21) Appl. No.: 17/779,790

(22) PCT Filed: Dec. 10, 2020

(86) PCT No.: PCT/JP2020/046145
§ 371 (c)(1),
(2) Date: May 25, 2022

(87) PCT Pub. No.: WO2021/117832
PCT Pub. Date: Jun. 17, 2021

(65) Prior Publication Data
US 2023/0003004 A1 Jan. 5, 2023

(30) Foreign Application Priority Data
Dec. 13, 2019 (JP) ................................. 2019-225812

(51) Int. Cl.
*E02F 9/20* (2006.01)
*E02F 9/26* (2006.01)
(52) U.S. Cl.
CPC .............. *E02F 9/2062* (2013.01); *E02F 9/26* (2013.01)

(58) Field of Classification Search
CPC ................................ E02F 9/2062; E02F 9/26
See application file for complete search history.

(56) References Cited

U.S. PATENT DOCUMENTS

2005/0107895 A1 5/2005 Pistikopoulos et al.
2007/0168085 A1 7/2007 Guilford
(Continued)

FOREIGN PATENT DOCUMENTS

CN 105040768 A 11/2015
CN 108060696 A 5/2018
(Continued)

OTHER PUBLICATIONS

Extended European Search Report issued Dec. 2, 2022 in European Patent Application No. 20899330.3, 8 pages.
(Continued)

*Primary Examiner* — James J Lee
*Assistant Examiner* — Steven Vu Nguyen
(74) *Attorney, Agent, or Firm* — Oblon, McClelland, Maier & Neustadt, L.L.P.

(57) ABSTRACT

According to the present invention, a controller determines whether the current performance of a piece of equipment satisfies a determination criterion, on the basis of the current state of the equipment, acquired by a sensor. If the controller determines that the current performance of the equipment does not satisfy the determination criterion, the controller calculates a parameter with which the performance of the equipment satisfies the determination criterion, on the basis of the current state of the equipment, acquired by the sensor, and the determination criterion. The controller changes a parameter managed by a storage device to the parameter calculated by the controller.

9 Claims, 11 Drawing Sheets

(56) References Cited

U.S. PATENT DOCUMENTS

| | | | | |
|---|---|---|---|---|
| 2018/0127951 A1* | 5/2018 | Taylor | .................... | E02F 9/226 |
| 2019/0317477 A1* | 10/2019 | Liang | ................. | G05B 13/0265 |
| 2020/0201527 A1* | 6/2020 | Nakajima | .............. | G05B 23/02 |

FOREIGN PATENT DOCUMENTS

| | | | |
|---|---|---|---|
| CN | 110465936 A | 11/2019 |
| EP | 2 966 612 A1 | 1/2016 |
| JP | 2000-297762 A | 10/2000 |
| JP | 2004-527860 A | 9/2004 |
| JP | 2007-141234 A | 6/2007 |
| JP | 2019-7356 A | 1/2019 |
| JP | 2019-79110 A | 5/2019 |

OTHER PUBLICATIONS

International Search Report issued Mar. 2, 2021, in PCT/JP2020/046145 filed Dec. 10, 2020, 2 pages.
Combined Chinese Office Action and Search Report issued May 23, 2024 in Chinese Patent Application No. 202080083258.6 (with unedited computer-generated English translation), 14 pages.

* cited by examiner

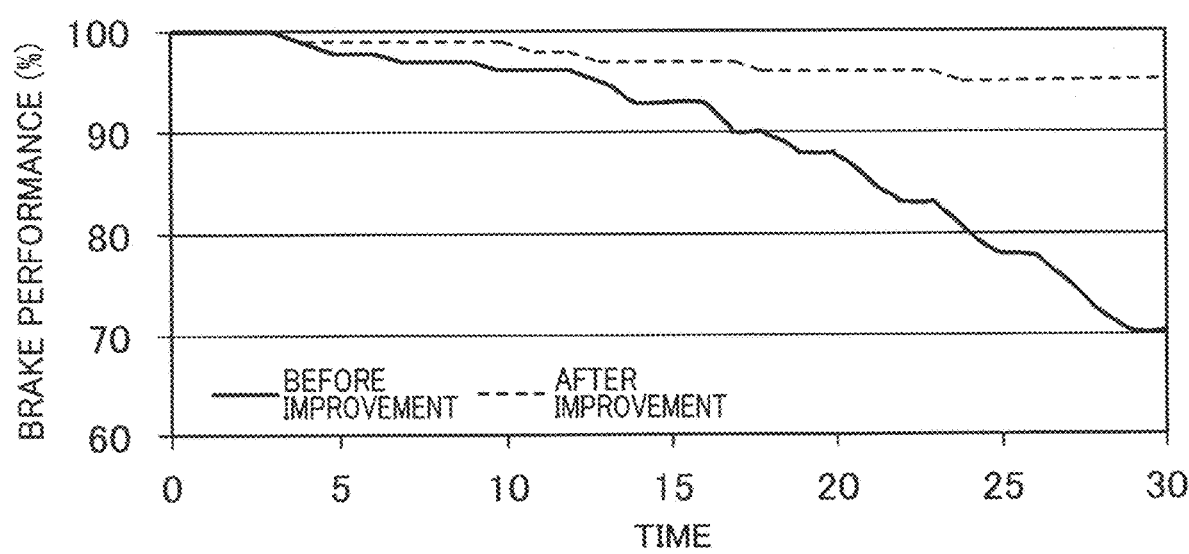

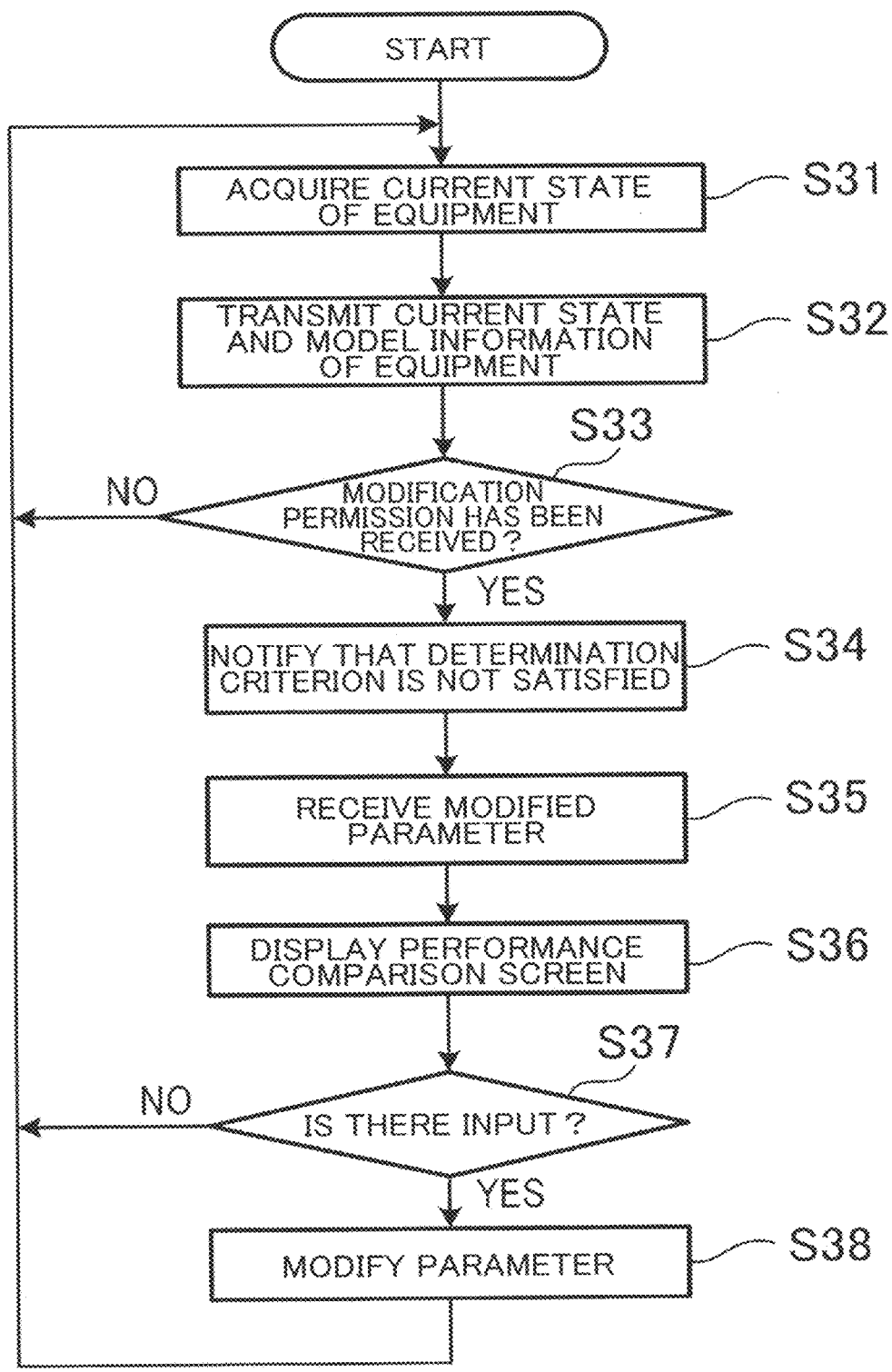

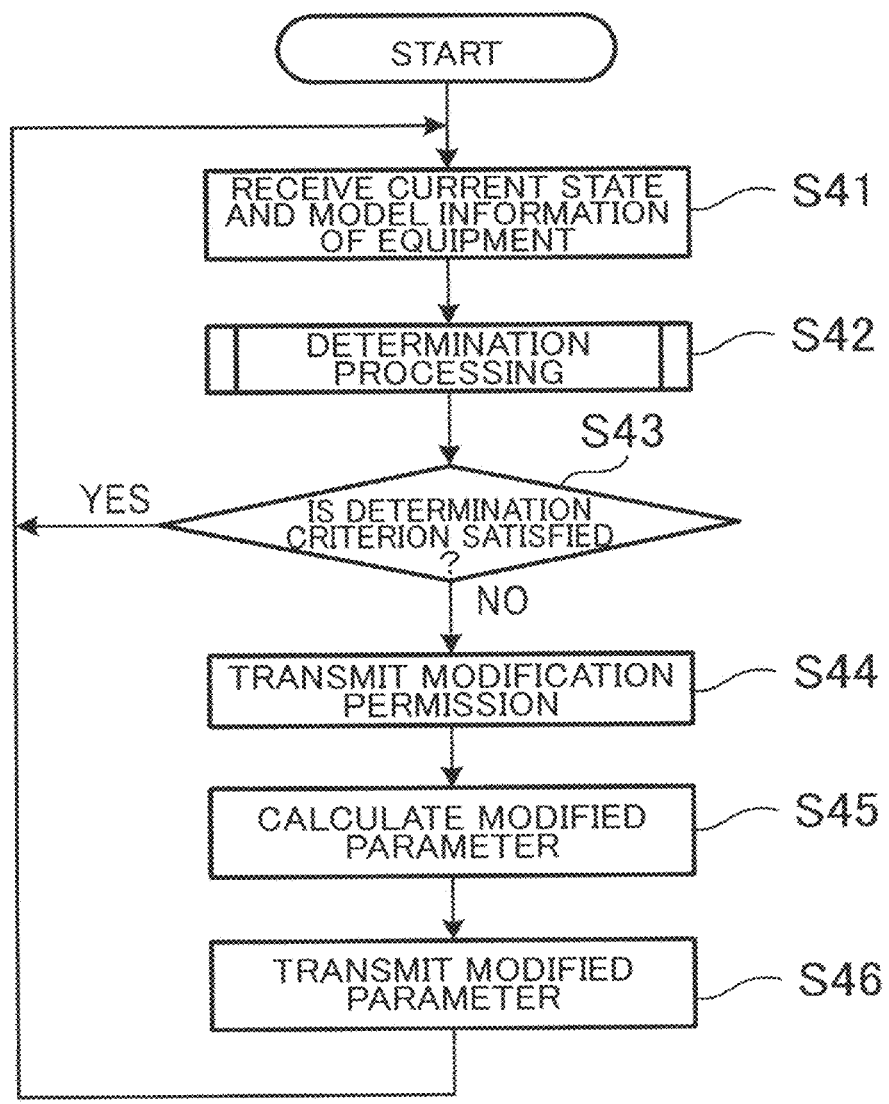

PARAMETER MODIFICATION SYSTEM, PARAMETER MODIFICATION METHOD, AND PARAMETER MODIFICATION PROGRAM FOR WORKING MACHINE

TECHNICAL FIELD

The present invention relates to a parameter modification system, a parameter modification method, and a parameter modification program for a working machine that modify a parameter of control software for controlling the working machine.

BACKGROUND ART

Patent Literature 1 discloses improved process control in which operation of a plant system is presented as a constant by model based design and operation control is optimized based on the obtained model.

Patent Literature 2 discloses a control loop adaptive adjustment system and method for setting a parameter for optimizing an output of a system component including loop control.

The state of the equipment of a working machine changes due to wear caused by work and aging. Therefore, even if the performance of equipment at the beginning of a new car satisfies a determination criterion related to the performance of the equipment, the determination criterion being set in advance, the performance of the equipment no longer satisfies the determination criterion as time elapses. Parameters of control software for controlling working machines are set on the assumption of a state where the equipment is brand new. Therefore, it is conceivable to modify the parameter so that the performance of the equipment satisfies the determination criterion.

Here, in Patent Literatures 1 and 2, a system is modeled and parameters are dynamically switched. However, since these do not assume working machines, determination criteria specific to working machines are not considered.

CITATION LIST

Patent Literature

Patent Literature 1: Japanese Unexamined Patent Application Publication No. 2004-527860
Patent Literature 2: Japanese Unexamined Patent Application Publication No. 2007-141234

SUMMARY OF INVENTION

An object of the present invention is to provide a parameter modification system, a parameter modification method, and a parameter modification program for a working machine that are able to cause performance of equipment to satisfy a determination criterion specific to the working machine even when the performance of the equipment of the working machine changes.

A parameter modification system according to one aspect of the present invention is a parameter modification system for a working machine that changes a parameter of control software for controlling a working machine, the parameter modification system including: a parameter management device that manages the parameter; a determination criterion management device that manages a determination criterion related to performance of equipment included in the working machine, the determination criterion being set in advance; an acquisition device that acquires a current state of the equipment; a determination section that determines whether current performance of the equipment satisfies the determination criterion based on a current state of the equipment acquired by the acquisition device; a calculation section that calculates a parameter that in which performance of the equipment satisfies the determination criterion based on a current state of the equipment acquired by the acquisition device and the determination criterion when the determination section determines that current performance of the equipment does not satisfy the determination criterion; and a modification section that modifies the parameter managed by the parameter management device to the parameter calculated by the calculation section.

A parameter modification method for a working machine according to another one aspect of the present invention is a parameter modification method for a working machine that changes a parameter of control software for controlling a working machine, the parameter modification method including: an acquisition step of acquiring a current state of equipment included in the working machine; a determination step of determining, based on a current state of the equipment having been acquired, whether current performance of the equipment satisfies a determination criterion related to performance of the equipment, the determination criterion being set in advance; a calculation step of calculating, based on a current state of the equipment having been acquired and the determination criterion, a parameter with which performance of the equipment satisfies the determination criterion when current performance of the equipment is not determined to satisfy the determination criterion; and a modification step of modifying the parameter managed by a parameter management device to the parameter having been calculated.

A parameter modification program for a working machine according to yet another one aspect of the present invention is a parameter modification program for a working machine, the parameter modification program causing a computer to function to modify a parameter of control software for controlling a working machine, the parameter modification program causing the computer to function as: an acquisition section that acquires a current state of equipment included in the working machine; a determination section that determines, based on a current state of the equipment having been acquired, whether current performance of the equipment satisfies a determination criterion related to performance of the equipment, the determination criterion being set in advance; a calculation section that calculates, based on a current state of the equipment having been acquired and the determination criterion, a parameter with which performance of the equipment satisfies the determination criterion when current performance of the equipment is not determined to satisfy the determination criterion; and a modification section that modifies the parameter managed by a parameter management device to the parameter having been calculated.

According to the present invention, when the current performance of equipment included in the working machine no longer satisfies the determination criterion, the parameter managed by the parameter management device is modified to the calculated parameter. When the parameter is modified, the performance of the equipment satisfies the determination criterion. Therefore, even if the performance of the equipment of the working machine changes, the performance of the equipment can satisfy the determination criterion specific to the working machine.

BRIEF DESCRIPTION OF DRAWINGS

FIG. 5 is a view expressing temporal change in brake performance before improvement and after improvement.

FIG. 10 is a flowchart of parameter modification control on a working machine side in the second embodiment.

FIG. 11 is a flowchart of parameter modification control on a server side in the second embodiment.

DESCRIPTION OF EMBODIMENTS

Embodiments of the present invention will be described below with reference to the accompanying drawings. Note that the following embodiments are examples embodying the present invention, and are not intended to limit the technical scope of the present invention.

Hereinafter, preferred embodiments of the present invention will be described with reference to the drawings.

First Embodiment (Configuration of Parameter Modification System)

Figure 1:
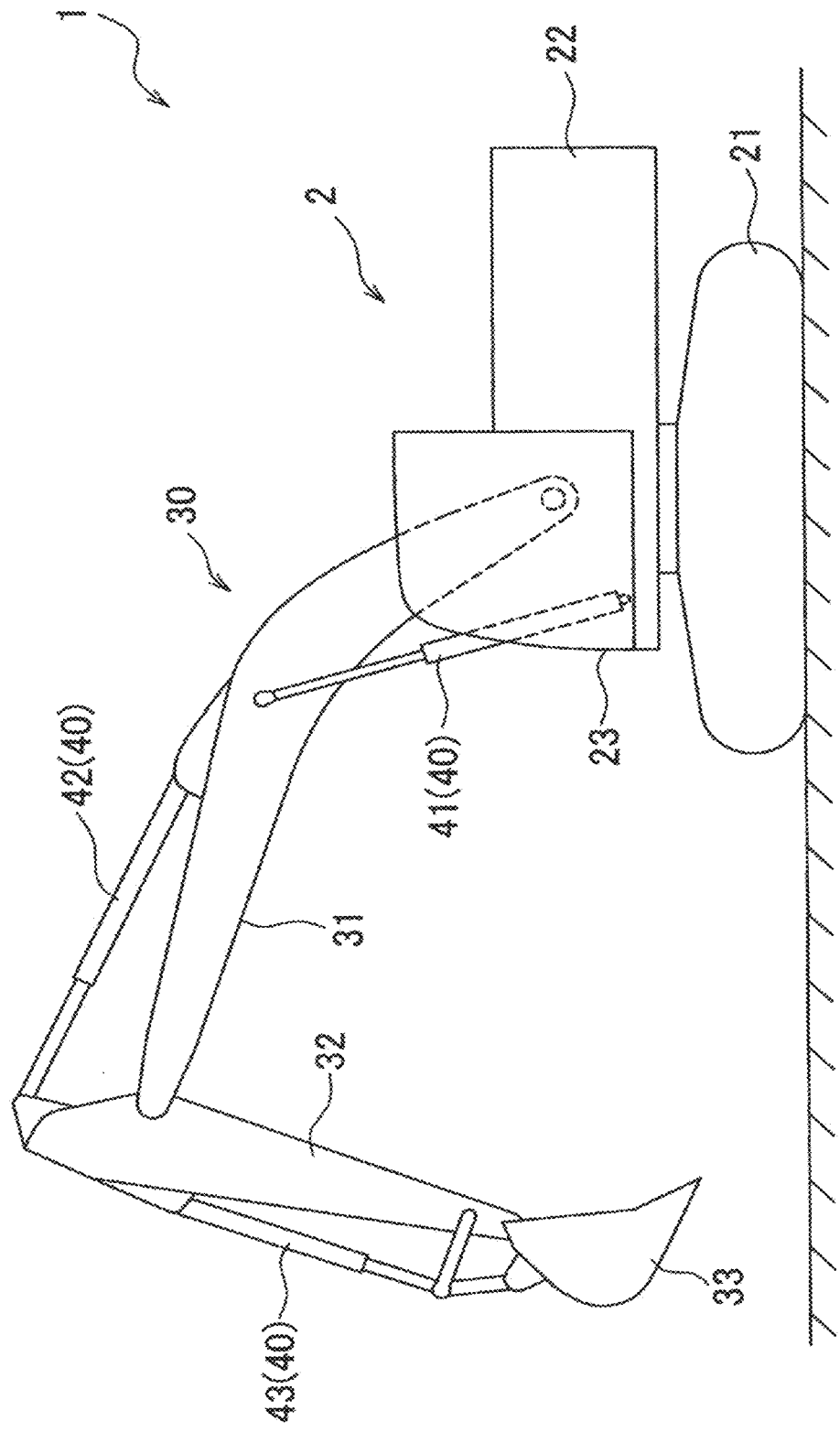
FIG. 1 is a side view of a working machine.

FIG. 1 is a side view of a working machine 2 to which a parameter modification system 1 for a working machine according to the first embodiment of the present invention is applied. As shown in FIG. 1, the parameter modification system 1 is provided in the working machine 2. The working machine 2 is a machine that performs work with an attachment 30, and is, for example, a hydraulic excavator. The working machine 2 includes a lower travelling body 21, an upper slewing body 22, the attachment 30, and a cylinder 40.

The lower travelling body 21 is a device that causes the working machine 2 to travel, and includes, for example, a crawler. The upper slewing body 22 is slewably attached above the lower travelling body 21 via a slewing device. A front part of the upper slewing body 22 is provided with a cab (operator's cab) 23.

The attachment 30 is attached to the upper slewing body 22. The attachment 30 includes a boom 31, an arm 32, and a bucket 33. The boom 31 is rotatably (so as to be raised and lowered) attached to the upper slewing body 22. The arm 32 is rotatably attached to the boom 31. The bucket 33 is rotatably attached to the arm 32. The bucket 33 is a device that performs work such as excavation, leveling, and scooping of a working target (earth and sand). Instead of the bucket 33, a tip attachment of a hydraulic crusher, a grapple, a breaker, a lifting magnet, or the like may be attached.

The cylinder 40 actuates the attachment 30. The cylinder 40 is a hydraulic telescopic cylinder. The cylinder 40 includes a boom cylinder 41, an arm cylinder 42, and a bucket cylinder 43.

The boom cylinder 41 rotationally drives the boom 31 with respect to the upper slewing body 22. A base end part of the boom cylinder 41 is rotatably attached to the upper slewing body 22. A tip end part of the boom cylinder 41 is rotatably attached to the boom 31.

The arm cylinder 42 rotationally drives the arm 32 with respect to the boom 31. A base end part of the arm cylinder 42 is rotatably attached to the boom 31. A tip end part of the arm cylinder 42 is rotatably attached to the arm 32.

The bucket cylinder 43 rotationally drives the bucket 33 with respect to the arm 32. A base end part of the bucket cylinder 43 is rotatably attached to the arm 32. A tip end part of the bucket cylinder 43 is rotatably attached to a link member rotatably attached to the bucket 33.

(Electrical Configuration of Parameter Modification System)

Figure 2:
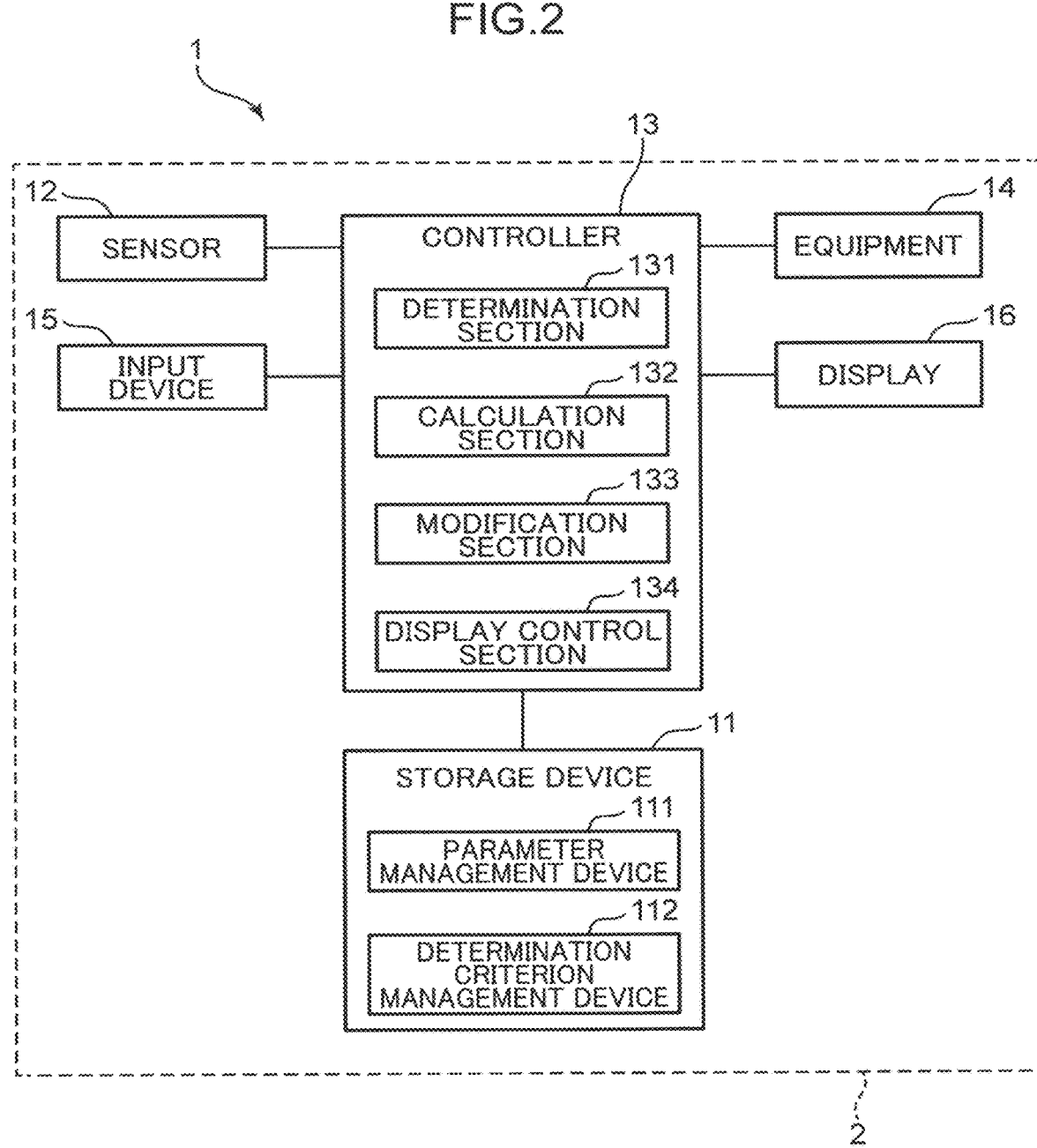
FIG. 2 is a circuit diagram of a parameter modification system in a first embodiment.

FIG. 2 is a circuit diagram of the parameter modification system 1. As shown in FIG. 2, the working machine 2 has a storage device 11 and a sensor 12. The storage device 11 includes a parameter management device 111 and a determination criterion management device 112. The parameter management device 111 manages parameters of control software for controlling the working machine 2.

The determination criterion management device 112 manages a determination criterion related to the performance of equipment 14 included in the working machine 2, the determination criterion being set in advance. Here, the equipment 14 included in the working machine 2 is controlled by a controller 13 described later, and is, for example, an engine, a main relief valve, a slewing device, or the like. The controller 13 converts an operation amount input to an operation device such as an operation lever by an operator into a command value of the equipment 14 using a parameter stored in the parameter management device 111. Therefore, the parameter is a coefficient for converting the operation amount input to the operation device such as the operation lever, for example, into a command value of the equipment 14.

In the present embodiment, the determination criterion is a shipment determination criterion set based on the state of the equipment 14 at the time of shipment of the working machine 2. However, the determination criterion is not limited to this. As shown in Table 1, the determination criterion has a reference value, an upper limit value, and a lower limit value. In Table 1, the upper limit value and the lower limit value are set based on the reference value, but the upper limit value and the lower limit value may be set based on a mean value of the measurement values of the sensor 12.

TABLE 1

| Item | Reference value | Upper limit value | Lower limit value |
| --- | --- | --- | --- |
| Engine rotation speed | 2000 | +25 | −25 |
| Main relief valve pressure | 37.5 | +1.0 | −1.0 |
| Slewing speed | 4.5 | +0.5 | −0.5 |
| Slewing brake performance | 95 | +10 | −10 |
| ... | .. | .. | .. |
| ... | .. | .. | .. |
| ... | .. | .. | .. |

The sensor (acquisition device) 12 acquires the current state of the equipment 14. Due to wear and aging, the state of the equipment 14 changes from a state of being brand new. The sensor 12 is at least one of a rotation speed sensor, a pressure sensor, a speed sensor, a gyro sensor, a temperature sensor, an infrared sensor, and a sound sensor. For example, when the equipment 14 is an engine, the sensor 12 is a rotation speed sensor that measures the rotation speed of the engine. When the equipment 14 is a main relief valve, the sensor 12 is a pressure sensor that measures the pressure of the main relief valve. The main relief valve restricts the discharge pressure of a hydraulic pump. When the equipment 14 is a slewing device, the sensor 12 is a speed sensor or the like that measures the slewing speed.

The working machine 2 has the controller 13. By executing control software, the controller 13 controls the equipment 14, and eventually controls the working machine 2. The controller 13 includes a determination section 131, a calculation section 132, a modification section 133, and a display control section 134.

The determination section 131 determines whether the current performance of the equipment 14 satisfies the determination criterion based on the current state of the equipment 14 acquired by the sensor 12.

When the determination section 131 determines that the current performance of the equipment 14 does not satisfy the determination criterion, the calculation section 132 calculates a parameter with which the performance of the equipment 14 satisfies the determination criterion based on the current state of the equipment acquired by the sensor 12 and the determination criterion. When the performance of the equipment 14 deteriorates from a state of being brand new, the current performance of the equipment 14 no longer satisfies the determination criterion. Parameters managed by the storage device 11 at the time of shipment of the working machine 2 are set on the assumption of a state where the equipment 14 is brand new. Therefore, the calculation section 132 calculates a parameter with which the performance of the equipment 14 satisfies the determination criterion for the equipment 14 whose current performance no longer satisfies the determination criterion.

The modification section 133 modifies the parameter managed by the parameter management device 111 to the parameter calculated by the calculation section 132.

Thus, when the current performance of the equipment 14 included in the working machine 2 no longer satisfies the determination criterion, the parameter managed by the parameter management device 11*l* is modified to the calculated parameter. When the parameter is modified, the performance of the equipment 14 satisfies the determination criterion. Therefore, even if the performance of the equipment 14 of the working machine 2 changes, the performance of the equipment 14 can satisfy the determination criterion specific to the working machine 2.

The determination criterion is a shipment determination criterion set based on the state of the equipment 14 at the time of shipment of the working machine 2. Thus, by modifying the parameter, it is possible to cause the performance of the equipment 14 to satisfy the shipment determination criterion.

The sensor 12 is at least one of a rotation speed sensor, a pressure sensor, a speed sensor, a gyro sensor, a temperature sensor, an infrared sensor, and a sound sensor. This makes it possible to suitably acquire the current state of the equipment 14.

Figure 3:
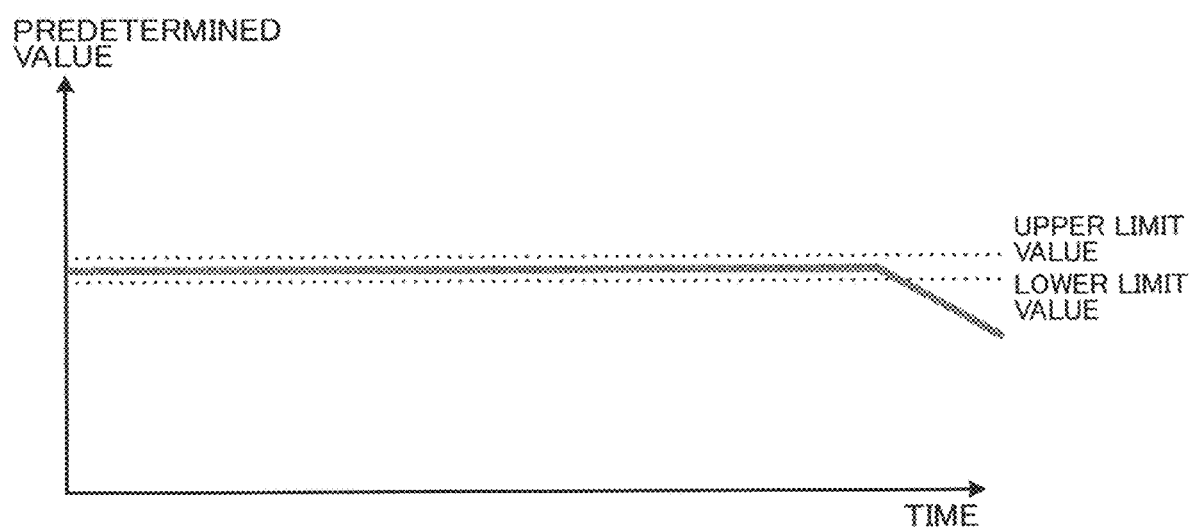
FIG. 3 is a view showing temporal change of a measurement value of a sensor.

FIG. 3 is a view showing temporal change of a measurement value of the sensor 12. When the measurement value falling between the upper limit value and the lower limit value falls below the lower limit value, for example, the determination section 131 determines that the current performance of the equipment 14 does not satisfy the determination criterion. The calculation section 132 calculates a parameter with which the performance of the equipment 14 satisfies the determination criterion. The modification section 133 modifies the parameter managed by the parameter management device 111 to the parameter calculated by the calculation section 132. When the measurement value exceeds the upper limit value, the parameter is modified similarly to when the measurement value falls below the lower limit value.

Note that even before the measurement value of the sensor 12 falls below the lower limit value or exceeds the upper limit value, the determination section 131 may constantly calculate a parameter with which the performance of the equipment 14 satisfies the determination criterion. In this case, when the measurement value of the sensor 12 falls below the lower limit value or exceeds the upper limit value, the determination section 131 determines that the current performance of the equipment 14 does not satisfy the determination criterion. Then, the modification section 133 may modify the parameter managed by the storage device 11 to the parameter calculated by the calculation section 132.

Referring back to FIG. 2. The working machine 2 has an input device 15 and a display (display device) 16. The input device 15 and the display 16 are disposed in the cab 23. The input device 15 may be a touchscreen superimposed on the display 16, may be a physical button, or may be a mobile terminal (e.g., smartphone) possessed by the operator of the working machine 2.

When the determination section 131 determines that the current performance of the equipment 14 does not satisfy the determination criterion, the display control section 134 causes the display 16 to display a screen for notifying that the current performance of the equipment 14 does not satisfy the determination criterion. Note that the display control section 134 may notify the operator that the current performance of the equipment 14 does not satisfy the determination criterion by a speaker, a lamp, or the like provided in the cab 23.

In the present embodiment, the modification section 133 modifies the parameter on condition that a parameter modification command is input to the input device 15. Specifically, when the determination section 131 determines that the current performance of the equipment 14 does not satisfy the determination criterion, the display control section 134 causes the display 16 to display a screen for asking whether to modify the parameter. Then, the modification section 133 modifies the parameter on condition that a parameter modification command having content for accepting the parameter modification is input to the input device 15.

Thus, the parameter is modified on condition that the parameter modification command is input to the input device 15. Therefore, the parameter is not modified when the parameter modification command is not input to the input device 15. This can cause the operator who operates the working machine 2, the manager who manages the site, or the like to determine whether to modify the parameter by leaving them the input to the input device 15.

Before accepting the input of the parameter modification command to the input device 15, the display control section 134 causes the display 16 to display a performance comparison screen in which the performance of the equipment 14 before the parameter modification and the performance of the equipment 14 after the parameter modification are arranged side by side.

Figure 4:
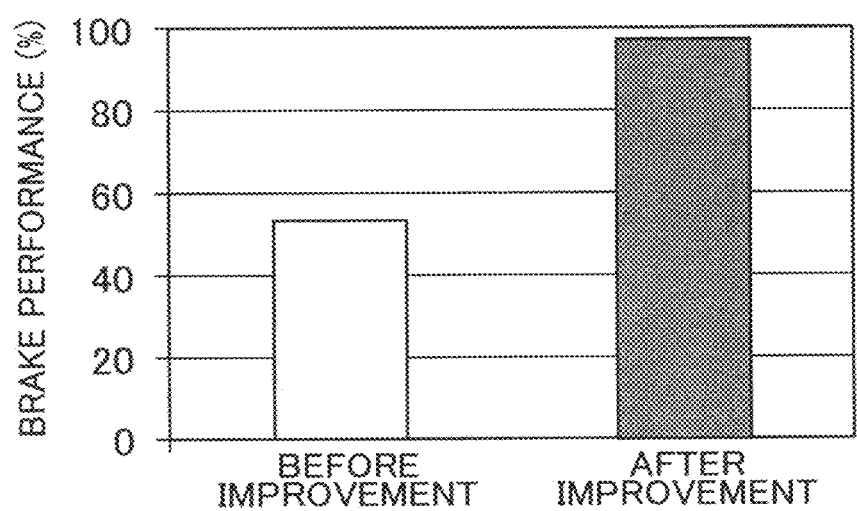
FIG. 4 is a bar graph for comparing brake performance before improvement and after improvement.

For example, when the performance of the equipment 14 is the brake performance of a slewing device, as shown in FIG. 4, the display control section 134 causes the display 16 to display a performance comparison screen including a bar graph for comparing the brake performance before the improvement and the brake performance after the improvement. Here, the performance before improvement refers to the performance of the equipment 14 before (current) the parameter is modified. The performance after improvement refers to the performance of the equipment 14 expected when the parameter is modified. The values shown in the bar graph are mean values, but are not limited to this.

When the performance of the equipment 14 is the brake performance of a slewing device, as shown in FIG. 5, the display control section 134 causes the display 16 to display a performance comparison screen including a graph indicating temporal change in brake performance before improvement and after improvement.

Thus, before accepting the input to the input device 15, the performance of the equipment 14 before the parameter modification and the performance of the equipment 14 after the parameter modification are displayed on the display 16. This can make it easy for the operator who operates the working machine 2, the manager who manages the site, or the like to determine whether to input the parameter modification command to the input device 15.

In the performance comparison screen, the difference between the two performances may be expressed by a numerical value or a color. The performance comparison screen is not limited to one that displays side by side the performance of the equipment 14 before the parameter modification and the performance of the equipment 14 after the parameter modification. For example, the display control section 134 may alternately display or superimpose the performance of the equipment 14 before the parameter modification and the performance of the equipment 14 after the parameter modification.

The brake performance is, for example, a braking time required from the start of braking until the working machine 2 actually stops. The parameter is a coefficient that converts an operation amount input to the slewing lever, for example, into a command value of the brake of the slewing device. In this case, the braking time that was A seconds before the parameter adjustment can be shortened to B seconds by adjusting the parameter. As a result, the brake performance satisfies the determination criterion.

The performance of the equipment 14 is a time required to generate an operation amount per unit time or a unit operation amount of a component that affects an actuator included in the working machine 2, such as brake performance or engine performance.

Here, the modification section 133 can modify the parameter during work of the working machine 2. Therefore, even during work of the working machine 2, when the parameter modification command is input to the input device 15, the parameter is modified. When the parameter is modified during work, the performance of the equipment 14 can be maintained without deteriorating work efficiency.

Specifically, while the working machine 2 is performing standard work such as excavation, the sensor 12 acquires time-series data of measurement values such as the engine rotation speed, the pump pressure, and the proportional valve instruction current value. The determination section 131 derives an estimation equation (approximate equation) of change in measurement value based on the time-series data of the measurement value having been acquired. This estimation equation is used for setting the upper limit value and the lower limit value. For example, assume that an estimation equation for a certain item is $f(t)=at$ (a: coefficient, t: time). In this case, the upper limit value is expressed by, for example, $g(t)=at+u$ ($u>0$), and the lower limit value is expressed by $h(t)=at-v$ ($v>0$).

The estimation equation is an equation for estimating the current (time t) state from the most recent state (time $t-\Delta t$) from the current. However, this is an example, and the estimation equation may be an equation for estimating the nearest future state from the current.

The determination section 131 calculates what value to be output when values of various items assumed in the determination criterion are input. Specifically, the determination section 131 compares the current state acquired by the sensor 12 with the current upper limit value $g(t)$ and the current lower limit value $h(t)$, and determines whether the current state falls within the range of the current upper limit value $g(t)$ and the current lower limit value $h(t)$. Then, when the determination section 131 determines that the current state is outside the range, the calculation section 132 calculates the parameter so that the current state falls within the current upper limit value $g(t)$ and the current lower limit value $h(t)$. This makes the current state satisfy the determination criterion. The various items include one or more thresholds. The calculation section 132 increases or decreases the parameter according to the degree of deviation of the current state acquired by the sensor 12 from the threshold. The sampling period in acquiring temporal change of the measurement value of the sensor 12 can be appropriately changed. ON/OFF of sampling can be appropriately switched by the operator of the working machine 2.

The controller 13 may be configured to modify the parameter by transitioning the state of the working machine 2 to a state in which the parameter can be modified. The state transition may be performed in an intangible manner using control software or may be performed in a tangible manner using a physical button. After the state transition, the display 16 is caused to display an operation example, and the operator is caused to actually perform this operation. Examples of the operation include a boom raising full lever, an arm pushing full lever, and a slewing full lever, but are not particularly limited.

During operation of the working machine 2, based on the temporal change of the measurement value, the determination section 131 calculates the upper limit value and the lower limit value based on the estimated value of the current state estimated to be output in a case where the values of various items assumed as the determination criterion are input, and sets the range of the upper limit value and the lower limit value as the determination criterion. Then, when the determination section 131 determines that the current state acquired by the sensor 12 deviates from the determination criterion, the calculation section 132 calculates the parameter so as to satisfy the determination criterion. After the parameter is modified or not modified, the state of the working machine 2 transitions to a normal work state. The controller 13 may execute a step of causing the operator to perform the same operation again to confirm whether the determination criterion is satisfied after the parameter is modified and before the state of the working machine 2 transitions to the normal work state.

Figure 6A:
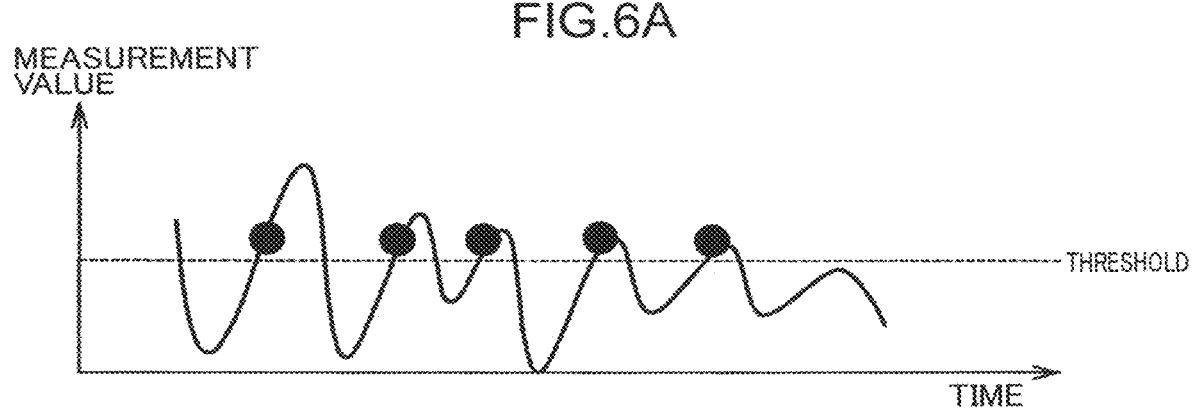
FIG. 6A is a view showing temporal change of a measurement value of the sensor in a case where there is one threshold.

FIG. 6A is a view showing temporal change of a measurement value of the sensor 12. As shown in FIG. 6A, a case where there is one threshold is considered. In this case, modification frequently occurs if the parameter is modified every time the measurement value exceeds the thresholds as indicated by the black circle. The modification of the parameter is executed by the controller 13 performing interruption processing. When the frequency of parameter modification is high, the processing load of the controller 13 increases.

Figure 6B:
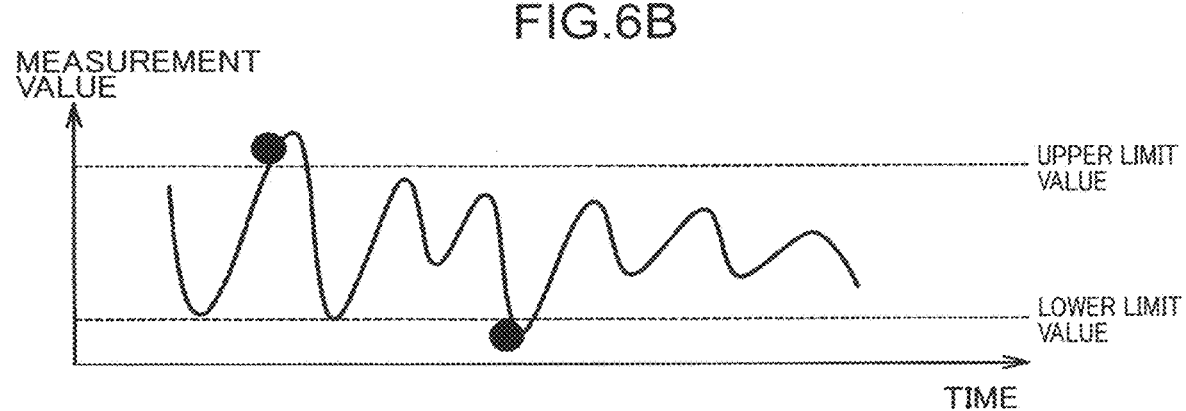
FIG. 6B is a view showing temporal change of a measurement value of the sensor in a case where an upper limit value and a lower limit value are provided.

FIG. 6B is a view showing temporal change of a measurement value of the sensor 12. As shown in FIG. 6B, in the present embodiment, the determination criterion has the upper limit value and the lower limit value. Then, in the present embodiment, in a case where the parameter has never been modified, the determination section 131 determines that the determination criterion is not satisfied when the current state of the equipment 14 acquired by the sensor 12 exceeds the upper limit value or when the current state of the equipment 14 acquired by the sensor 12 falls below the lower limit value. In a case where the parameter has been modified at least once, the determination section 131 determines that the determination criterion is not satisfied when the current state of the equipment 14 exceeds the upper limit value in the previous determination and the current state of the equipment 14 falls below the lower limit value in the current determination. Furthermore, in a case where the parameter has been modified at least once, the determination section 131 determines that the determination criterion is not satisfied when the current state of the equipment 14 falls below the lower limit value in the previous determination and the current state of the equipment 14 exceeds the upper limit value in the current determination.

More specifically, with reference to FIG. 6B, the determination section 131 determines whether the current state of the equipment 14 exceeds the upper limit value and the current state of the equipment 14 falls below the lower limit value in a state where the parameter has never been modified. In FIG. 6B, since the measurement value exceeds the upper limit value (left black circle), the determination section 131 determines that the determination criterion is not satisfied. Due to this, the parameter is modified. Next, in a case where the parameter has been modified at least once, the determination section 131 determines whether the current state of the equipment 14 that has previously exceeded the upper limit value falls below the lower limit value and whether the current state of the equipment 14 that has previously fallen below the lower limit value exceeds the upper limit value. In FIG. 6B, since the measurement value having once exceeded the upper limit value next falls below the lower limit value (right black circle), the determination section 131 determines that the determination criterion is not satisfied. Due to this, the parameter is modified again. Then, the determination section 131 repeats the determination processing after the parameter is modified at least once.

By doing so, it is possible to suppress the frequency at which the current state of the equipment 14 exceeds the upper limit value or the lower limit value. Therefore, it is possible to reduce the load applied on the processing of calculating the modified parameter to modify the parameter.

(Operation of Parameter Modification System)

Next, the operation of the parameter modification system 1 will be described with reference to FIG. 7, which is a flowchart of parameter modification control.

First, the sensor 12 acquires the current state of the equipment 14 (step S1). Then, the determination section 131 performs the determination processing shown in FIG. 8 (step S2). The determination processing will be described later.

Next, the determination section 131 determines whether the current performance of the equipment 14 satisfies the determination criterion (step S3). When it is determined in step S3 that the current performance of the equipment 14 satisfies the determination criterion (S3: YES), the processing returns to step S1. On the other hand, when it is determined in step S3 that the current performance of the equipment 14 does not satisfy the determination criterion (S3: NO), the display control section 134 causes the display 16 to display a screen notifying that the current performance of the equipment 14 does not satisfy the determination criterion (step S4).

Next, the calculation section 132 calculates a parameter with which the performance of the equipment 14 satisfies the determination criterion based on the current state of the equipment 14 acquired by the sensor 12 and the determination criterion (step S5). Then, the display control section 134 causes the display 16 to display the performance comparison screen (step S6).

Next, the modification section 133 determines whether a parameter modification command has been input to the input device 15 (step S7). When it is determined in step S7 that a parameter modification command has not been input to the input device 15 (S7: NO), the processing returns to step S1. On the other hand, when it is determined in step S7 that the parameter modification command has been input to the input device 15 (S7: YES), the modification section 133 modifies the parameter managed by the parameter management device 111 to the parameter calculated by the calculation section 132 (step S8). When the processing of step S8 ends, the processing returns to step S1.

Figure 8:
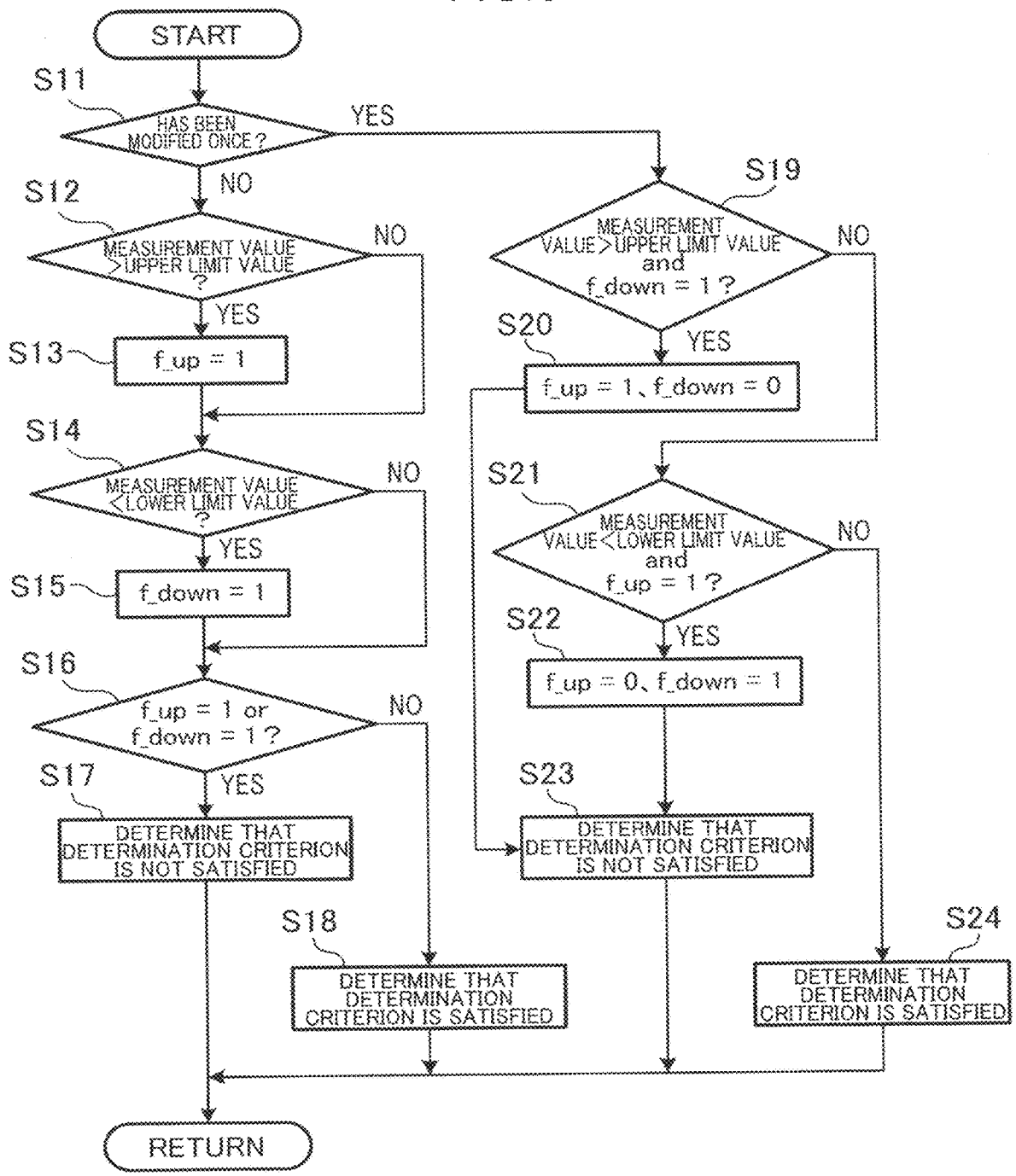
FIG. 8 is a flowchart of determination processing.

Next, the determination processing will be described with reference to FIG. 8, which is a flowchart of the determination processing.

First, the determination section 131 determines whether the parameter has been modified at least once (step S11). Specifically, when at least one of a flag f_up and a flag f_down is 1, the determination section 131 determines that the parameter has been modified at least once. On the other hand, when both the flag f_up and the flag f_down are 0, the determination section 131 determines that the parameter has never been modified. The flag f_up is a flag indicating a history in which the measurement value has exceeded the upper limit value. The flag f_down is a flag indicating a history in which the measurement value has fallen below the lower limit value. When it is determined in step S11 that the parameter has never been modified (S11: NO), the determination section 131 determines whether the measurement value of the sensor 12 is larger than the upper limit value (step S12).

When it is determined in step S12 that the measurement value of the sensor 12 is larger than the upper limit value (S12: YES), the determination section 131 sets the flag f_up to 1 (step S13) and proceeds with the processing to step S14. Note that in a state where the parameter has never been modified, both the flag f_up and the flag f_down are set to 0.

When it is determined in step S12 that the measurement value of the sensor 12 is equal to or less than the upper limit value (S12: NO), or after step S13, the determination section 131 determines whether the measurement value of the sensor 12 has fallen below the lower limit value (step S14).

When it is determined in step S14 that the measurement value of the sensor 12 has fallen below the lower limit value (S14: YES), the determination section 131 sets the flag f_down to 1 (step S15) and proceeds with the processing to step S16.

When it is determined in step S14 that the measurement value of the sensor 12 is equal to or greater than the lower limit value (S14: NO), or after step S15, the determination section 131 determines whether the flag f_up is 1 or the flag f_down is 1 (step S16). When it is determined in step S16 that the flag f_up is 1 or the flag f_down is 1 (S16: YES), the determination section 131 determines that the current performance of the equipment 14 does not satisfy the determination criterion (step S17) and returns the processing to that in the flowchart of FIG. 7.

On the other hand, when it is determined in step S16 that the flag f_up is 0 and the flag f_down is 0 (S16: NO), the determination section 131 determines that the current performance of the equipment 14 satisfies the determination criterion (step S18), and returns the processing to that in the flowchart of FIG. 7.

When it is determined in step S11 that the parameter has been modified at least once (S11: YES), the determination section 131 determines whether the measurement value of the sensor 12 exceeds the upper limit value and the flag f_down is 1 (step S19). When it is determined in step S19 that the measurement value of the sensor 12 exceeds the upper limit value and the flag f_down is 1 (S19: YES), the determination section 131 sets the flag f_up to 1 and the flag f_down to 0 (step S20), and proceeds with the processing to step S21. For example, when the measurement value of the sensor 12 falls below the lower limit value and then exceeds the upper limit value, it is determined as YES in step S19, and the flag f_up is set to 1 and the flag f_down is set to 0 in step S20.

When it is determined in step S19 that the measurement value of the sensor 12 is equal to or less than the upper limit value or the flag f_down is 0 (S19: NO), the processing proceeds to step S21. For example, in a case where the measurement value of the sensor 12 has fallen below the lower limit value but thereafter the measurement value of the sensor 12 has not exceeded the upper limit value, it is determined as NO in step S19.

In step S21, the determination section 131 determines whether the measurement value of the sensor 12 falls below the lower limit value and the flag f_up is 1. When it is determined in step S21 that the measurement value of the sensor 12 falls below the lower limit value and the flag f_up is 1 (S21: YES), the determination section 131 sets the flag f_up to 0 and the flag f_down to 1 (step S22), and proceeds with the processing to step S23. For example, when the measurement value of the sensor 12 exceeds the upper limit value and then falls below the lower limit value, it is determined as YES in step S21, and the flag f_up is set to 0 and the flag f_down is set to 1 in step S22.

When it is determined in step S21 that the measurement value of the sensor 12 is equal to or greater than the lower limit value or the flag f_up is 0 (S21: NO), the processing proceeds to step S24. For example, in a case where the measurement value of the sensor 12 exceeds the upper limit value but thereafter the measurement value of the sensor 12 does not fall below the lower limit value, it is determined as NO in step S21.

Figure 7:
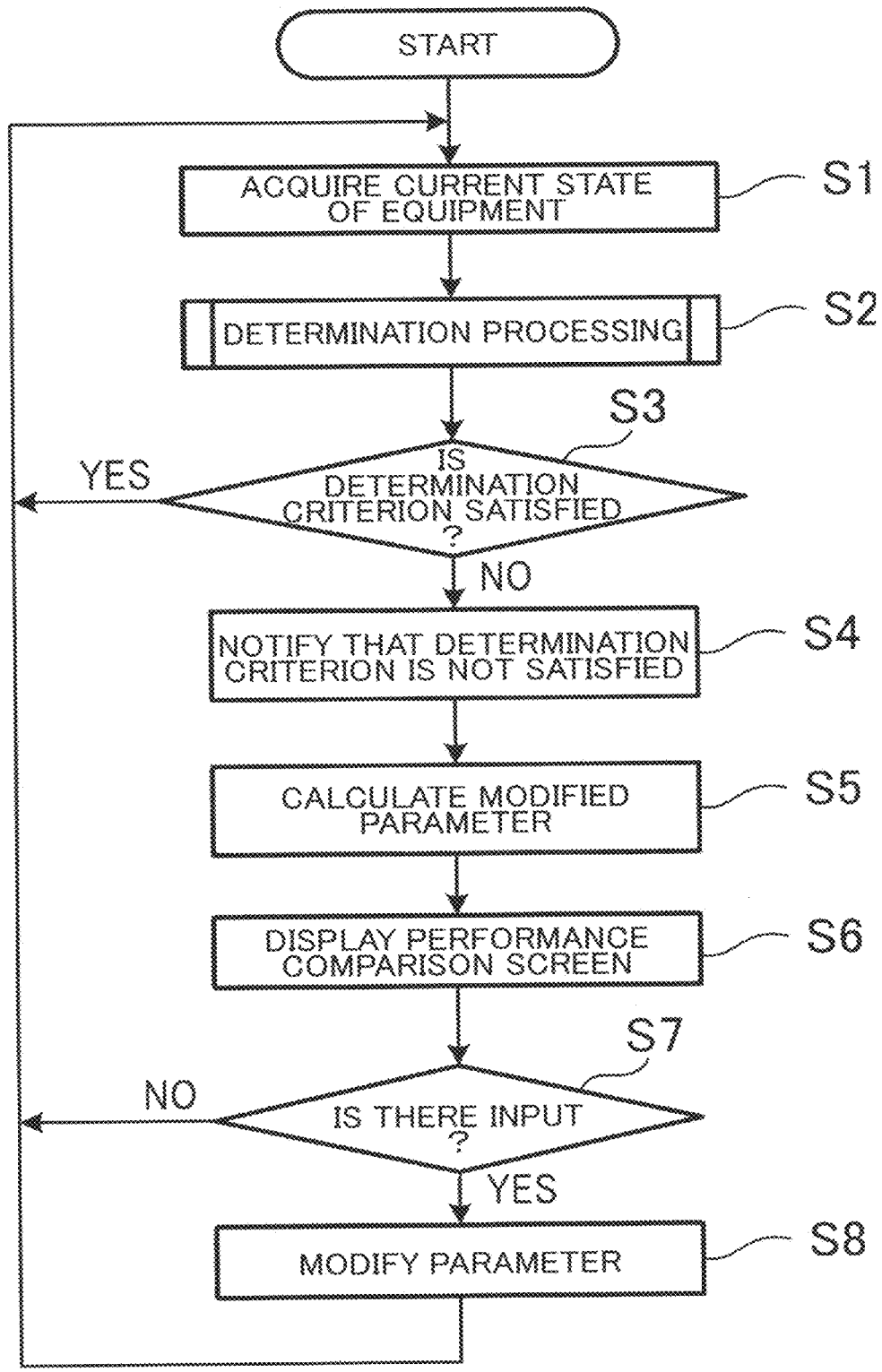
FIG. 7 is a flowchart of parameter modification control in the first embodiment.

In step S23, the determination section 131 determines that the current performance of the equipment 14 does not satisfy the determination criterion, and returns the processing to FIG. 7. Due to this, when the measurement value of the sensor 12 falls below the lower limit value and then exceeds the upper limit value, it is determined that the current performance of the equipment 14 does not satisfy the determination criterion. Alternatively, when the measurement value of the sensor 12 exceeds the upper limit value and then falls below the lower limit value, it is determined that the current performance of the equipment 14 does not satisfy the determination criterion.

On the other hand, in step S24, the determination section 131 determines that the current performance of the equipment 14 satisfies the determination criterion, and returns the processing to that in the flowchart of FIG. 7. Due to this, when the measurement value of the sensor 12 falls below the lower limit value and then does not exceed the upper limit value, it is determined that the determination criterion is satisfied. Alternatively, when the measurement value of the sensor 12 exceeds the upper limit value and then does not fall below the lower limit value, it is determined that the determination criterion is satisfied.

Effects

As described above, according to the parameter modification system 1 according to the present embodiment, when the current performance of the equipment 14 included in the working machine 2 no longer satisfies the determination criterion, the parameter managed by the storage device 11 is modified to the calculated parameter. When the parameter is modified, the performance of the equipment 14 satisfies the determination criterion. Therefore, in the parameter modification system 1, even if the performance of the equipment 14 of the working machine 2 changes, the performance of the equipment 14 can satisfy the determination criterion specific to the working machine 2.

According to the parameter modification system 1, the current state of the equipment 14 can be suitably acquired by at least one of the rotation speed sensor, the pressure sensor, the speed sensor, the gyro sensor, the temperature sensor, the infrared sensor, and the sound sensor.

The parameter is modified on condition that the parameter modification command is input to the input device 15. Therefore, the parameter is not modified when the parameter modification command is not input to the input device 15. Due to this, the parameter modification system 1 can cause the operator who operates the working machine 2, the manager who manages the site, or the like to determine whether to modify the parameter by leaving them the input to the input device 15.

Before accepting the input to the input device 15, the performance of the equipment 14 before the parameter modification and the performance of the equipment 14 after the parameter modification are displayed on the display 16. Due to this, the parameter modification system 1 can make it easy for the operator who operates the working machine 2, the manager who manages the site, or the like to determine whether to input to the input device 15.

The determination criterion is set based on the state of the equipment 14 at the time of shipment of the working machine 2. Thus, in the parameter modification system 1, by modifying the parameter, it is possible to cause the performance of the equipment 14 to satisfy the determination criterion at the time of shipment.

There is a case where the parameter is modified during work of the working machine 2. When the parameter is modified during work, the performance of the equipment 14 can be maintained without deteriorating work efficiency.

The parameter is modified in a case where the current state of the equipment 14 exceeds the upper limit value or falls below the lower limit value in the determination before the parameter is modified once. Then, the parameter is modified in a case where the current state of the equipment 14 that has previously exceeded the upper limit value falls below the lower limit value or the current state of the equipment 14 that has previously fallen below the lower limit value exceeds the upper limit value in the determination after the parameter is modified once. By doing so, it is possible to suppress the frequency at which the current state of the equipment 14 exceeds the upper limit value or the lower limit value. Therefore, since it is possible to suppress the frequency at which the parameter is modified, it is possible to reduce the load applied on the processing of calculating the modified parameter to modify the parameter.

Second Embodiment

Next, the parameter modification system according to the second embodiment will be described with reference to the drawings. Note that the configuration common to that of the first embodiment and the effect achieved by the configuration will not be described, and differences from the first embodiment will mainly be described. Note that the same members as those in the first embodiment are denoted by the same reference numerals as those in the first embodiment.
(Electrical Configuration of Parameter Modification System)

Figure 9:
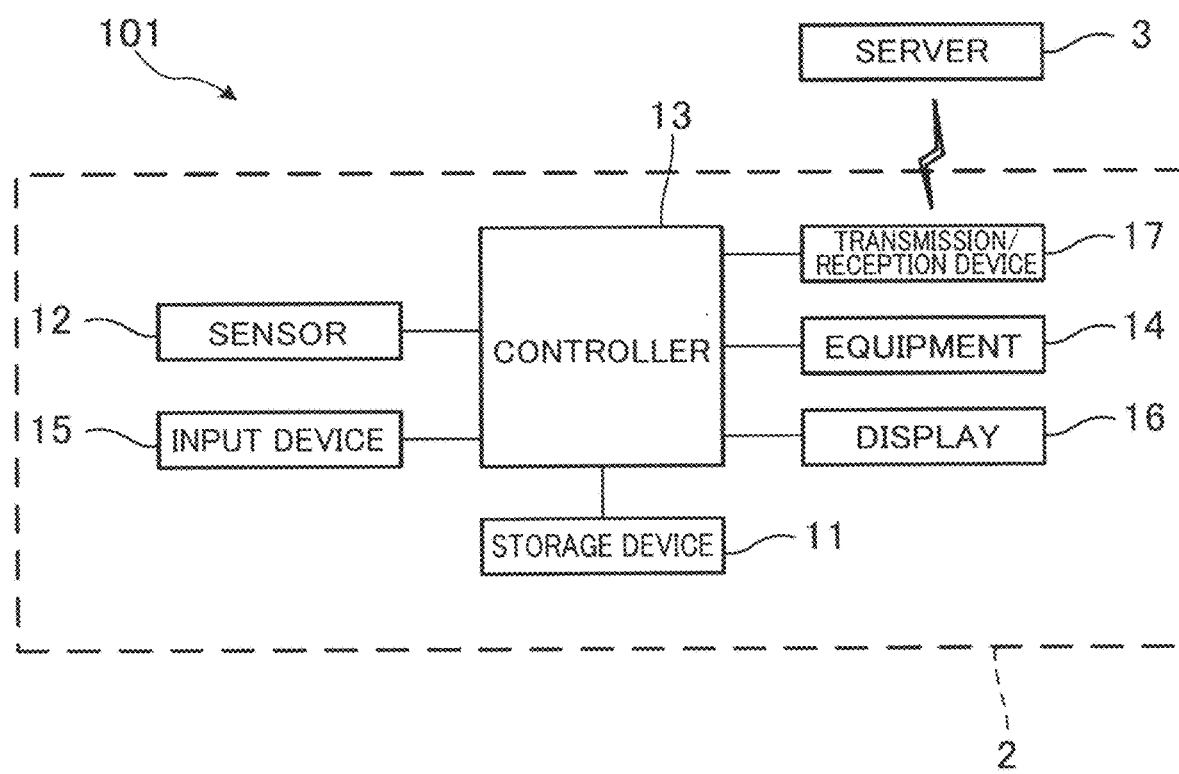
FIG. 9 is a circuit diagram of a parameter modification system in a second embodiment.

FIG. 9 is a circuit diagram of a parameter modification system 101. As shown in FIG. 9, the parameter modification system 101 according to the second embodiment of the present invention has the working machine 2 and the server 3.

In the first embodiment, the controller 13 of the working machine 2 performs determination as to whether the current performance of the equipment 14 satisfies the determination criterion and calculation of the updated parameter. In the present embodiment, the server 3 performs the above determination and calculation. In the present embodiment, the determination criterion is managed by a storage device of the server 3.

As shown in FIG. 9, the working machine 2 has a transmission/reception device 17. The transmission/reception device 17 can transmit/receive data to/from the server 3.

The controller 13 of the working machine 2 transmits, to the server 3 via the transmission/reception device 17, the current state of the equipment 14 acquired by the sensor 12. The server 3 determines whether the current performance of the equipment 14 satisfies the determination criterion based on the current state of the equipment 14 received from the working machine 2. Then, when determining that the current performance of the equipment 14 does not satisfy the determination criterion, the server 3 transmits modification permission to the working machine 2.

When determining itself that the current performance of the equipment 14 does not satisfy the determination criterion, the server 3 calculates a parameter with which the performance of the equipment 14 satisfies the determination criterion. Then, the server 3 transmits the calculated parameter to the working machine 2.

The controller 13 of the working machine 2 modifies the parameter managed by the storage device 11 to the parameter received from the server 3. The controller 13 of the working machine 2 may notify the server 3 of the modification to the parameter received from the server 3. In this case, the server 3 that has received the notification may save the calculated parameter.
(Operation of Parameter Modification System)

FIGS. 10 and 11 are flowcharts of the parameter modification control. The operation of the parameter modification system 101 will be described with reference to FIGS. 10 and 11.

First, the parameter modification control on the working machine 2 side will be described with reference to FIG. 10. The sensor 12 acquires the current state of the equipment 14 (step S31). The controller 13 transmits the current state and model information of the equipment 14 to the server 3 using the transmission/reception device 17 (step S32). The model information is a product number, a version number, and the like of software.

Next, the controller 13 determines whether the modification permission has been received from the server 3 (step S33). When it is determined in step S33 that the modification permission has not been received from the server 3 (S33: NO), the processing returns to step S31. On the other hand, when it is determined in step S33 that the modification permission is received from the server 3 (S33: YES), the controller 13 causes the display 16 to display a screen notifying that the current performance of the equipment 14 does not satisfy the determination criterion (step S34).

Next, the controller 13 receives, from the server 3, a parameter (modified parameter) with which the performance of the equipment 14 satisfies the determination criterion (step S35). Then, the controller 13 causes the display 16 to display a performance comparison screen (step S36).

Next, the controller 13 determines whether a parameter modification command has been input to the input device 15 (step S37). When it is determined in step S37 that the parameter modification command has not been input to the input device 15 (S37: NO), the processing returns to step S31. On the other hand, when it is determined in step S37 that the parameter modification command has been input to the input device 15 (S37: YES), the controller 13 modifies the parameter managed by the storage device 11 to the parameter calculated by itself (step S38). When step S38 ends, the processing returns to step S31.

Next, the parameter modification control on the server 3 side will be described with reference to FIG. 11. The controller (server-side controller) of the server 3 receives the current state and model information of the equipment 14 from the working machine 2 (step S41). Then, the server-side controller performs the determination processing shown in FIG. 8 (step S42).

Next, the server-side controller determines whether the current performance of the equipment 14 satisfies the determination criterion based on the current state of the equipment 14 (step S43). When it is determined in step S43 that the current performance of the equipment 14 satisfies the determination criterion (S43: YES), the processing returns to step S41. On the other hand, when it is determined in step S43 that the current performance of the equipment 14 does not satisfy the determination criterion (S43: NO), the server-side controller transmits the modification permission to the working machine 2 (step S44).

Next, the server-side controller calculates a parameter with which the performance of the equipment 14 satisfies the determination criterion based on the current state of the equipment 14 and the determination criterion (step S45). Then, the controller 13 transmits the modified parameter to the working machine 2 using the transmission/reception device 17 (step S46). When step S46 ends, the processing returns to step S41.

As described above, the parameter modification system 101 according to the present embodiment has the same effects as those of the first embodiment.

Note that the present embodiment can adopt the following modifications.

(1) The flowchart of FIG. 7 may include, after step S1, processing of calculating the above-described estimation equation and setting the upper limit value and the lower limit value from the estimation equation.

(2) The flowchart of FIG. 7 may be started when the working machine 2 is brought into a specific state. The specific state is, for example, a state in which at least one of a boom raising full lever, an arm pushing full lever, and a slewing full lever is input.

While the embodiments of the present invention have been described above, they are merely specific examples, and the present invention is not particularly limited. The specific configuration and the like can be modified in design as appropriate. The actions and effects described in the embodiments of the present invention are merely enumeration of the most suitable actions and effects resulting from the present invention, and the actions and effects according to the present invention are not limited to those described in the embodiments of the present invention.

Summary of Embodiments

The present embodiment is summarized as follows.

A parameter modification system in the present embodiment is a parameter modification system for a working machine that changes a parameter of control software for controlling a working machine, the parameter modification system including: a parameter management device that manages the parameter; a determination criterion management device that manages a determination criterion related to performance of equipment included in the working machine, the determination criterion being set in advance; an acquisition device that acquires a current state of the equipment; a determination section that determines whether current performance of the equipment satisfies the determination criterion based on a current state of the equipment acquired by the acquisition device; a calculation section that calculates a parameter that in which performance of the equipment satisfies the determination criterion based on a current state of the equipment acquired by the acquisition device and the determination criterion when the determination section determines that current performance of the equipment does not satisfy the determination criterion; and a modification section that modifies the parameter managed by the parameter management device to the parameter calculated by the calculation section.

According to the present configuration, when the current performance of the equipment included in the working machine no longer satisfies the determination criterion, the parameter managed by the parameter management device is modified to the calculated parameter. When the parameter is modified, the performance of the equipment satisfies the determination criterion. Therefore, even if the performance of the equipment of the working machine changes, the performance of the equipment can satisfy the determination criterion specific to the working machine.

In the parameter modification system, the acquisition device may include at least one of a rotation speed sensor, a pressure sensor, a speed sensor, a gyro sensor, a temperature sensor, an infrared sensor, and a sound sensor.

According to the present configuration, the current state of the equipment can be suitably acquired by at least one of the rotation speed sensor, the pressure sensor, the speed sensor, the gyro sensor, the temperature sensor, the infrared sensor, and the sound sensor.

The parameter modification system may further include an input device configured to input a parameter modification command, and the modification section may modify the parameter on condition that a parameter modification command is input to the input device.

According to the present configuration, the parameter is modified on condition that the parameter modification command is input to the input device. Therefore, the parameter is not modified when the parameter modification command is not input to the input device. This can cause the operator who operates the working machine, the manager who manages the site, or the like to determine whether to modify the parameter by leaving them the input to the input device.

The parameter modification system may further includes a display device, and a display control section that causes the display device to display performance of the equipment before the parameter is modified and performance of the equipment after the parameter is modified, before receiving input to the input device.

According to the present configuration, the performance of the equipment before the parameter modification and the performance of the equipment after the parameter modification are displayed on the display before the input to the input device is received. This can make it easy for the operator who operates the working machine, the manager who manages the site, or the like to determine whether to input to the input device.

In the parameter modification system, the determination criterion may be set based on a state of the equipment at the time of shipment of the working machine.

According to the present configuration, the determination criterion is set based on the state of the equipment at the time of shipment of the working machine. Thus, by modifying the parameter, it is possible to cause the performance of the equipment 14 to satisfy the determination criterion at the time of shipment.

In the parameter modification system, the modification section may be capable of modifying the parameter during work of the working machine.

According to the present configuration, when the parameter is modified during work, the performance of the equipment can be maintained without deteriorating the work efficiency.

In the parameter modification system, the determination criterion may include a reference value, an upper limit value, and a lower limit value, and the determination section may determine that performance of the equipment does not satisfy the determination criterion when a current state of the equipment exceeds the upper limit value in a previous determination and a current state of the equipment falls below the lower limit value in a current determination, or when a current state of the equipment falls below the lower limit value in a previous determination and a current state of the equipment exceeds the upper limit value in a current determination.

According to the present configuration, when the current state of the equipment exceeds the upper limit value or falls below the lower limit value in the determination before the parameter is modified once, it is determined that the performance of the equipment does not satisfy the determination criterion, and the parameter is modified. Then, in the determination after the parameter is modified once, when the current state of the equipment that has previously exceeded the upper limit value falls below the lower limit value or the current state of the equipment that has previously fallen below the lower limit value exceeds the upper limit value, it is determined that the performance of the equipment does not satisfy the determination criterion, and the parameter is modified. By doing so, it is possible to suppress the frequency at which the current state of the equipment exceeds the upper limit value or the lower limit value. Therefore, since it is possible to suppress the frequency at which the parameter is modified, it is possible to reduce the load applied on the processing of calculating the modified parameter to modify the parameter.

In the parameter modification system, the parameter may be a coefficient for converting an operation amount input to the working machine into a command value of the equipment.

According to the present configuration, since the state of the equipment satisfies the determination criterion by adjusting the coefficient for converting the operation into a command value, the state of the equipment can satisfy the determination criterion by simple processing.

The invention claimed is:

1. A parameter modification system for a working machine that changes a parameter of control software for controlling the working machine, the parameter modification system comprising:
    a memory that stores the parameter;
    a determination criterion related to performance of equipment included in the working machine, the determination criterion being set in advance;
    an acquisition device configured of a sensor, acquiring a current state of the equipment;
    a determination section configured of a controller, determining whether current performance of the equipment satisfies the determination criterion based on the current state of the equipment acquired by the acquisition device;
    a calculation section configured of the controller, calculating a parameter that in which performance of the equipment satisfies the determination criterion based on the current state of the equipment acquired by the acquisition device and the determination criterion when the determination section determines that current performance of the equipment does not satisfy the determination criterion;
    and a modification section configured of the controller, modifying the parameter stored by the memory to the parameter calculated by the calculation section,
    wherein the determination criterion includes a reference value, an upper limit value, and a lower limit value, the upper limit value and the lower limit value are set based on the reference value, and
    wherein the determination section determines that performance of the equipment does not satisfy the determination criterion when a current state of the equipment exceeds the upper limit value in a previous determination and a current state of the equipment falls below the lower limit value in a current determination, or when a current state of the equipment falls below the lower limit value in a previous determination and a current state of the equipment exceeds the upper limit value in a current determination.

2. The parameter modification system for the working machine according to claim 1, wherein the acquisition device includes at least one of a rotation speed sensor, a pressure sensor, a speed sensor, a gyro sensor, a temperature sensor, an infrared sensor, and a sound sensor.

3. The parameter modification system for the working machine according to claim 1, further comprising:
    an input device configured to input a parameter modification command, wherein
    the modification section configured of the controller modifies the parameter on condition that the parameter modification command is input to the input device.

4. The parameter modification system for the working machine according to claim 3 further comprising:
    a display device; and
    a display control section configured of the controller causes the display device to display performance of the equipment before the parameter is modified and performance of the equipment after the parameter is modified, before receiving input to the input device.

5. The parameter modification system for the working machine according to claim 1, wherein the determination criterion is set based on a state of the equipment at a time of shipment of the working machine.

6. The parameter modification system for the working machine according to claim 1, wherein the modification section configured of the controller is capable of modifying the parameter during work of the working machine.

7. The parameter modification system according to claim 1, wherein the parameter is a coefficient for converting an operation amount input to the working machine into a command value of the equipment.

8. A parameter modification method for a working machine that changes a parameter of control software for controlling the working machine, the parameter modification method comprising:
    an acquisition step of acquiring a current state of equipment included in the working machine;
    a determination step of determining, based on the current state of the equipment having been acquired, whether current performance of the equipment satisfies a determination criterion related to performance of the equipment, the determination criterion being set in advance;
    a calculation step of calculating, based on the current state of the equipment having been acquired and the determination criterion, a parameter with which performance of the equipment satisfies the determination criterion when current performance of the equipment is not determined to satisfy the determination criterion; and
    a modification step of modifying the parameter managed by a parameter management device to the parameter having been calculated,
    wherein the determination criterion includes a reference value, an upper limit value, and a lower limit value, the upper limit value and the lower limit value are set based on the reference value, and
    wherein the determination step determines that performance of the equipment does not satisfy the determination criterion when a current state of the equipment exceeds the upper limit value in a previous determination and a current state of the equipment falls below the lower limit value in a current determination, or when a current state of the equipment falls below the lower limit value in a previous determination and a current state of the equipment exceeds the upper limit value in a current determination.

9. A non-transitory computer-readable recording medium recording a parameter modification program for a working machine, the parameter modification program causing a computer to function to modify a parameter of control software for controlling the working machine, the parameter modification program causing the computer to function as:
    an acquisition section that acquires the current state of equipment included in the working machine;
    a determination section that determines, based on the current state of the equipment having been acquired, whether current performance of the equipment satisfies a determination criterion related to performance of the equipment, the determination criterion being set in advance;

a calculation section that calculates, based on the current state of the equipment having been acquired and the determination criterion, a parameter with which performance of the equipment satisfies the determination criterion when current performance of the equipment is not determined to satisfy the determination criterion; and a modification section that modifies the parameter managed by a parameter management device to the parameter having been calculated, wherein the determination criterion includes a reference value, an upper limit value, and a lower limit value, the upper limit value and the lower limit value are set based on the reference value, and wherein the determination section determines that performance of the equipment does not satisfy the determination criterion when a current state of the equipment exceeds the upper limit value in a previous determination and a current state of the equipment falls below the lower limit value in a current determination, or when a current state of the equipment falls below the lower limit value in a previous determination and a current state of the equipment exceeds the upper limit value in a current determination.

\* \* \* \* \*